(12) United States Patent
Gutscher et al.

(10) Patent No.: US 9,133,798 B2
(45) Date of Patent: Sep. 15, 2015

(54) TANK ARRANGEMENT HAVING A MECHANICAL PRESSURE REGULATOR, AND VEHICLE

(75) Inventors: Andreas Gutscher, Markgroeningen (DE); Andreas Posselt, Muehlacker (DE); Marko Lorenz, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/990,039

(22) PCT Filed: Sep. 27, 2011

(86) PCT No.: PCT/EP2011/066784
§ 371 (c)(1),
(2), (4) Date: May 28, 2013

(87) PCT Pub. No.: WO2012/069237
PCT Pub. Date: May 31, 2012

(65) Prior Publication Data
US 2013/0248027 A1   Sep. 26, 2013

(30) Foreign Application Priority Data
Nov. 26, 2010   (DE) .......................... 10 2010 062 075

(51) Int. Cl.
*F02M 37/10* (2006.01)
*B60K 15/03* (2006.01)
(Continued)

(52) U.S. Cl.
CPC ............ *F02M 37/106* (2013.01); *B60K 15/077* (2013.01); *F02M 37/0094* (2013.01);
(Continued)

(58) Field of Classification Search
CPC .............. F02M 37/106; F02M 37/025; F02M 37/0094; B60K 2015/0777; Y10T 137/86043; Y10T 137/4824; Y10T 137/4841
USPC .......... 137/264, 265, 565.15, 565.22, 565.34; 123/502, 506, 514; 417/40
See application file for complete search history.

(56) References Cited

U.S. PATENT DOCUMENTS

| 5,743,239 A * | 4/1998 | Iwase ............................. 123/514 |
| 2002/0043253 A1 * | 4/2002 | Begley et al. ................. 123/497 |

(Continued)

FOREIGN PATENT DOCUMENTS

| DE | 10327562 | 6/2004 |
| DE | 10327582 | 6/2004 |

(Continued)

OTHER PUBLICATIONS
International Search Report for Application No. PCT/EP2011/066784 dated Feb. 7, 2013 (2 pages).

*Primary Examiner* — Atif Chaudry
(74) *Attorney, Agent, or Firm* — Michael Best & Friedrich LLP

(57) ABSTRACT

The invention relates to a tank arrangement (2), comprising a fuel tank (4) comprising at least one fuel chamber (6, 6a, *b*), a tank installation unit (8) arranged in the fuel tank (4), a fuel pump element (10) arranged in the installation unit (8) and designed to make fuel (12) available from the tank arrangement (2) to a fuel user (14), a pump unit (6, 16a, *b*) arranged in the fuel chamber (6, 6a, *b*) and operatively connected to the fuel pump element (10) and designed to convey fuel (12) out of the fuel chamber (6, 6a, *b*) into the tank installation unit (8), and a pressure regulating element (18), functionally arranged between fuel pump element (10) and pump unit (16). The arrangement is characterized in that the pressure regulating element (18) is designed as a mechanical pressure regulator.

20 Claims, 2 Drawing Sheets

(51) Int. Cl.
*F02M 37/00* (2006.01)
*F02M 59/44* (2006.01)
*F02M 37/02* (2006.01)
*B60K 15/077* (2006.01)

(52) U.S. Cl.
CPC ............ *F02M37/025* (2013.01); *F02M 59/44* (2013.01); *B60K 2015/0325* (2013.01); *B60K 2015/03111* (2013.01); *B60K 2015/03125* (2013.01); *B60K 2015/03138* (2013.01); *B60K 2015/03263* (2013.01); *B60K 2015/03473* (2013.01); *B60K 2015/0777* (2013.01); *Y10T 137/4824* (2015.04); *Y10T 137/4841* (2015.04); *Y10T 137/85978* (2015.04); *Y10T 137/85986* (2015.04); *Y10T 137/86043* (2015.04)

(56) References Cited

U.S. PATENT DOCUMENTS

2008/0095642 A1    4/2008  Schelhas et al.
2008/0149074 A1*   6/2008  Voelker ..................... 123/511

FOREIGN PATENT DOCUMENTS

| | | |
|---|---|---|
| DE | 102004049286 | 4/2006 |
| DE | 102005036188 | 2/2007 |
| DE | 102007028514 | 12/2008 |
| EP | 773361 | 5/1997 |
| WO | 2010053045 | 5/2010 |

* cited by examiner

TANK ARRANGEMENT HAVING A MECHANICAL PRESSURE REGULATOR, AND VEHICLE

BACKGROUND OF THE INVENTION

The present invention proceeds from a tank arrangement and a vehicle.

Vehicles having a gasoline engine, for example motor vehicles or automobiles, usually have a fuel tank, in which fuel or gasoline is stored and is fed in a regulated or controlled manner to a fuel consumer, for example an internal combustion engine.

Usual tank configurations here may be, for example, a fuel tank with a fuel chamber, a tank installation unit, a tank level sensor and a pump unit, for example a suction jet pump. Using the pump unit, fuel is delivered continuously from the fuel chamber into the tank installation unit. Here, the tank installation unit has, for example, a volume which is comparatively low in comparison with the fuel chamber.

Furthermore, a fuel pump element, for example an electric fuel pump, may also be arranged in the tank installation unit, which fuel pump element provides fuel from the fuel tank and therefore, in particular, from the tank installation unit to the fuel consumer. Here, in particular, a tank installation unit may make reliable provision of fuel to the fuel consumer possible. The tank level sensor may provide, in particular, a signal with regard to the filling level of the fuel chamber.

Furthermore, a fuel tank may also comprise two or more fuel chambers. The latter may be spatially and functionally separate or else, in the case of a saddle tank, for example, with a main fuel chamber and a saddle fuel chamber, may also be connected to one another. A fuel tank of this type may likewise have one or more tank installation units, two or more tank level sensors and two or more pump units or suction jet pumps. It is advantageous, in particular, to provide at least one tank level sensor and a pump unit per fuel chamber.

SUMMARY OF THE INVENTION

Accordingly, a tank arrangement and a motor vehicle having a tank arrangement according to the invention with a pump unit management system are specified, characterized in that the pressure regulating element is configured as a mechanical pressure regulator or as a passive pressure relief valve.

Using the pump unit, for example a suction jet pump, fuel may be capable of being delivered from different, separate tank regions or fuel chambers into the pot of the tank installation unit or the main tank installation unit. A drive of a suction jet pump may be realized, for example, from the forward or return delivery flow of the fuel pump element or by use of a second fuel pump element. In this case, the second fuel pump element may be set up exclusively for the operation of the suction jet pump or suction jet pumps and thus provide or deliver a suction jet pump working quantity of fuel.

Furthermore, pressure limiting or pressure regulation may be relevant in the switch-off case. In the hot switch-off case, for example of an internal combustion engine, reheating of the fuel system occurs. As a result, the system pressure may rise in a line system, for example between a fuel pump element and a fuel consumer such as the injection valves of an internal combustion engine. In order to protect components of the line system and the fuel supply against damage, a pressure relief valve may be arranged in the fuel system and/or in the line system.

Heating by incident solar radiation may likewise lead to a pressure build-up in the line system. It may be necessary to limit a maximum system pressure here too, in order to limit or prevent, for example, leaks at the injection valves.

For a restart of an internal combustion engine, it may be advantageous, in contrast, if the necessary operating pressure, therefore a prevailing line pressure or a required system pressure, does not have to be built up again completely, and is therefore maintained in the line system at least partially.

Load sensing regulation or load sensing control in a fuel supply system may provide, for example, that a fuel pump element is regulated to a defined value as a function of a fuel requirement or an operating point, and is therefore actuated by a defined signal.

For systems with gasoline direct injection, controlled systems may be provided which manage, for example, without a feedback signal by a low pressure fuel sensor. In contrast, however, a minimum low fuel pressure has to be maintained in the case of gasoline direct injection, in particular at high temperatures, in order to avoid that a high pressure pump is operated with vaporous fuel.

Furthermore, in purely controlled operation, thus operation without regulation, a certain allowance on the basis, for example, of a series production spread of a fuel pump element is provided, on account of the lack of a low pressure signal, and thus of a feedback signal. This is to be understood, in particular, as meaning that a fuel pump element is actuated by way of a defined signal, and the pressure which results by way of this and the pump delivery rate which results from this on the basis of a series production spread of the manufacturing of the fuel pump element and/or of the fuel supply system cannot be predicted precisely, but rather only in a certain defined range. In a regulated system, a feedback signal of the fuel pump element would then be used which correlates with a pressure or a pump delivery rate, in order for it to be possible as a result to set the desired operating point of the fuel pump element precisely. In controlled operation, however, a feedback signal of this type is not available, with the result that a certain safety allowance has to be incorporated into the actuation of the fuel pump element and a certain inaccuracy has to be accepted.

Here, the tank arrangement according to the invention may optimize the activation of a pump unit, for example the switch-on strategy of a suction jet pump, and at the same time provide a pressure limitation in a switch-off case or in a heating case. Furthermore, the minimization of an allowance in the case of purely controlled systems, for example of a fuel pump element, may be made possible by adaptation of the system spread, for example by indirect feedback of a pump delivery rate of the fuel pump element.

In particular, the switching on and off of the pump unit, for example of a suction jet pump, may be carried out with the use of a mechanical pressure regulator, configured, for example, as a mechanical pressure regulator or a passive pressure relief valve. The mechanical pressure regulator may likewise make limiting of the system pressure of a line system possible in a switch-off case as a result of reheating or as a result of any other heating. Since a mechanical pressure regulator of this type is capable of opening and closing at a relatively precisely predefined opening pressure, an adaptation of the series production spread of a fuel pump element may be performed as a result.

A pump unit is thus operated only when there is a requirement. The delivery quantity of a fuel pump element, for example the working quantity for a suction jet pump, may be dispensed with occasionally as a result, depending on the tank filling level and operating point. Furthermore, an allowance on the basis of system spread can be reduced in the case of controlled systems. This also results in a reduced consumption, therefore reduced CO2 pollution and reduced component loading. Production costs for a system can be reduced by a combination of a pump unit management system with a simultaneous pressure relief function. As a result of the indirect measurement of the pump delivery rate of a fuel pump element, a purely controlled system may at the same time be realized more easily.

The present invention uses a suction jet pump which is operated via a mechanical pressure regulator. In other words, the suction jet pump or pumps is/are operated when the system pressure of a line system exceeds the opening pressure of the mechanical pressure regulator and, in particular, provides a sufficient working quantity. This may occur, in particular, when the system pressure is increased anyway on account of certain operating conditions, for example in a starting case or at full load. It is likewise also conceivable that the suction jet pump is set in operation by a targeted pressure increase, for example if the tank installation unit has a low fuel tank.

In particular, the present invention may be used in standard tanks with one fuel chamber and in saddle tanks, in which, in addition to a suction jet pump in the main fuel chamber, in which the tank installation unit is arranged, one or more transfer pump units or transfer suction jet pumps are also used in a saddle fuel chamber, in order to fill either the main chamber of the fuel tank or else the tank installation unit with fuel.

In a case of this type, an opening pressure of a pressure regulator according to the invention for the suction jet pump of the main fuel chamber may be selected to be close to a customary operating pressure. As a result, the main fuel chamber is filled continuously, unless the line pressure is lowered in a targeted manner, for example in an idling phase in the case of a sufficiently full tank installation unit.

The opening pressure of one or more mechanical pressure regulators which is/are arranged, for example, on one or more transfer suction jet pumps may lie above a usual operating pressure. The transfer suction jet pumps which are likewise capable of filling the main fuel chamber or the tank installation unit can therefore be activated by a targeted increase in the operating pressure in the line system.

Emptying of a fuel chamber may be detected by a tank level sensor which is arranged there. The signal of the tank level sensor, therefore the signal that a certain fuel chamber is being emptied, may be understood to be a type of feedback signal, concerning what operating pressure is currently prevailing in a line system.

In the following text, the basic method of operation of the present invention will be described using a construction of a saddle tank with two suction jet pumps which are both provided in each case with a mechanical pressure regulator.

In the case where no tank level sensor feeds back a signal, according to which a fuel chamber is being emptied, this may allow a system pressure below a normal operating pressure to be deduced, and therefore a line pressure which lies below the opening pressures of the two mechanical pressure regulators. If then only the tank level sensor of the main fuel chamber detects emptying of the fuel chamber, this may allow a system pressure to be deduced which deduce between the first operating pressure, at which the first pressure regulator opens, and a second, increased operating pressure, at which the transfer pressure regulator opens. If both tank level sensors supply a signal, according to which the corresponding fuel chambers are being emptied, this can allow a system pressure above the second, increased operating pressure to be deduced.

A fuel pump element may be actuated, for example, by a pulse width modulation signal. Here, the actuating signal is modulated at a constant frequency via the pulse duty factor, and is therefore modified in the width of a pulse. Thus, for example, the pulse duty factor or an actuating duty factor of a signal for actuating a fuel pump element may be increased until a reduction in the content of a fuel chamber is indicated by way of the use of a tank level sensor. Thus, in the case of this actuating duty factor, the system pressure which is currently prevailing in the line system correlates with the respectively known opening pressure of a pressure regulator. As a result of this, it is then known which actuating duty factor is capable of actuating a fuel pump element in such a way that a defined system pressure is generated.

Starting from a high system pressure, the pressure may also be reduced until the saddle side of a saddle tank is no longer emptied, since the mechanical pressure regulator which is arranged there closes on account of the lowering of the system pressure.

As a result of the installation of mechanical pressure regulators, the pressure in a hot switch-off case may also be limited and held at a required maximum system pressure. Here, in the case of a plurality of mechanical pressure regulators being installed, that pressure regulator which has the lowest opening pressure is decisive.

BRIEF DESCRIPTION OF THE DRAWINGS

Exemplary embodiments of the invention are shown in the following drawings and are explained in greater detail in the associated description.

In the drawings.

DETAILED DESCRIPTION

Figure 1:
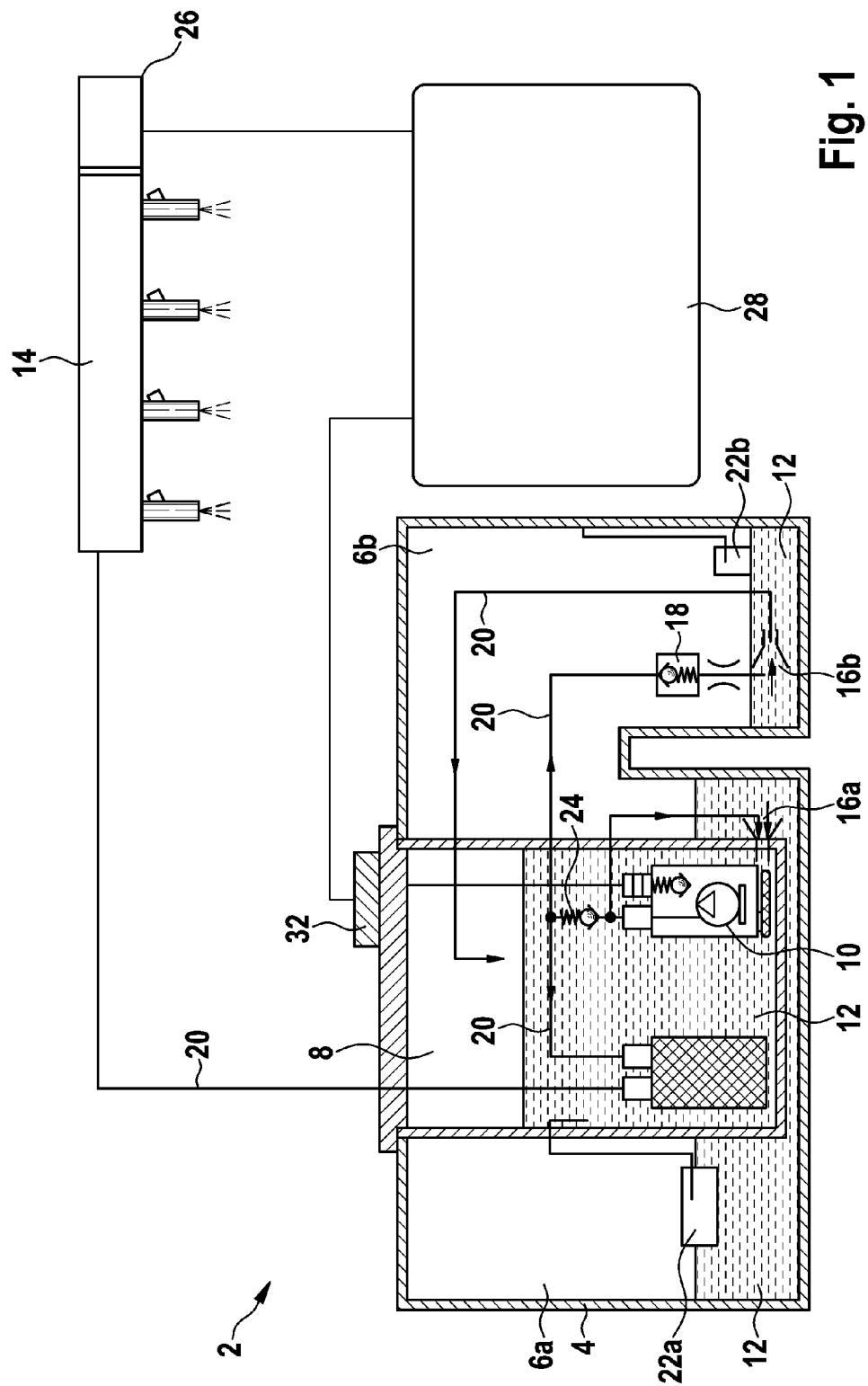
FIG. 1 shows an exemplary embodiment of a tank arrangement according to the present invention.

FIG. 1 shows an exemplary embodiment of a tank arrangement according to the present invention.

FIG. 1 shows tank arrangement 2 with a fuel tank 4, configured as a saddle tank. Fuel tank 4 has two fuel chambers 6a, b which have a tank installation unit 8. The tank installation unit 8 is connected directly to the fuel chamber 6a via a pump unit 16a. The further fuel chamber 6b has a further pump unit 16b, configured by way of example as a suction jet pump, which is likewise set up to deliver fuel 12, in this case from the fuel chamber 6b, into the main fuel chamber 6a or directly into the tank installation unit 8.

Fuel pump element 10, for example an electric fuel pump, is arranged in the tank installation unit, which electric fuel pump is connected via the line system 20 to a fuel consumer 14, via a filter element 34, for example a gasoline filter. Here, the fuel consumer 14 is shown as a fuel rail of an internal combustion engine.

The fuel pump element 10 is capable of receiving fuel 12 directly from the tank installation unit and of delivering it with the use of the line system 20. The supply line of the pump unit 16a, configured by way of example as a suction jet pump, is arranged directly at the outlet of the fuel pump 10. As soon as the fuel pump element 10 is activated, fuel 12 from the fuel chamber 6a is therefore delivered into the tank installation unit 8 with the use of the pump unit 16a.

A pressure valve 24, for example configured as a nonreturn valve, is arranged in the line system 20 downstream of the branch to the pump unit 16a, which pressure valve 24 opens at a defined line pressure in the line system 20, for example of 0.5 bar, and closes at a lower pressure. The line system 20 branches downstream of pressure valve 24 in the direction of the fuel consumer 14 and in the direction of the fuel chamber 6*b*. Pressure regulating element 18 and, following it, pump unit 16*b* are arranged in the fuel chamber 6*b*.

Pressure regulating element 18 may, for example, be a mechanical pressure regulator or a passive pressure relief valve which opens at a line system pressure in the line system 20 which is greater than a defined limit pressure, for example in the range from 4 to 5 bar. Therefore, if the opening pressure of the pressure regulating element 18 is exceeded, the pump unit 16*b* is activated and fuel 12 is likewise delivered via its return line into the tank installation unit 8.

A tank level sensor 22*a, b* is arranged in each of the fuel chambers 6*a*, 6*b*, which tank level sensor 22*a, b* may detect, in particular, if fuel 12 is being delivered from the respective fuel chamber 6*a, b* into the tank installation unit 8 using the pump units 16*a, b*.

If the fuel pump element 10 is operated by way of an actuating signal which causes a system pressure below the defined opening pressure of the pressure valve 24, for example of below 0.5 bar, fuel 12 may exclusively be delivered, in particular, from fuel chamber 6*a* into the tank installation unit 8. This results from the fact that pressure valve 24 does not yet open in this case.

In the case of a system pressure above the defined opening pressure of the pressure valve 24, but below the defined opening pressure of the pressure regulating element 18, fuel 12 is substantially transported, in addition to the pump delivery rate of the pump unit 16*a*, via the line system 20 through the fuel filter 34 to the fuel consumer 14.

Fuel pump element 10 may then be actuated in such a way until a system pressure is achieved in the line system 20, which system pressure causes the pressure regulating element 18 to open and therefore fuel to be delivered by pump unit 16*b*. Opening of the pressure regulating element 18 may be detected by tank level sensor 22*b* on account of the fuel delivery, and therefore the emptying of the fuel chamber 6*b*. A corresponding detection signal of the tank level sensor 22*b* may be reported to an electronic system 28 which is also connected to the fuel pump element 10, for example via a coupling element 32.

Electronic system 28 may therefore determine, via the detection of a signal of the tank level sensor 22*b*, that the line pressure in the line system 20 corresponds to the opening pressure of the pressure regulating element 18. It may therefore be detected at a defined opening pressure of the pressure element 18, for example of 4 or 5 bar, using the tank level sensor 22*b* that the system pressure of the line system 20 likewise lies at said defined opening pressure, without itself requiring or obtaining a calibrated or precise feedback signal from the fuel pump element 10.

As a result, a delivery rate or a system pressure which is caused by fuel pump element 10 can be deduced indirectly via the signal of the tank level sensor 22*b*, without precise feedback being received from fuel pump element 10 itself. As a result, a series production spread in the actuation of the fuel pump element 10 may be compensated for.

Furthermore, a pressure sensor 26 which is likewise connected to electronic system 28 is arranged on the fuel consumer 14. Here, the pressure sensor supplies pressure information to electronic system 28 which uses said pressure information to actuate the fuel pump element 10.

Figure 2:
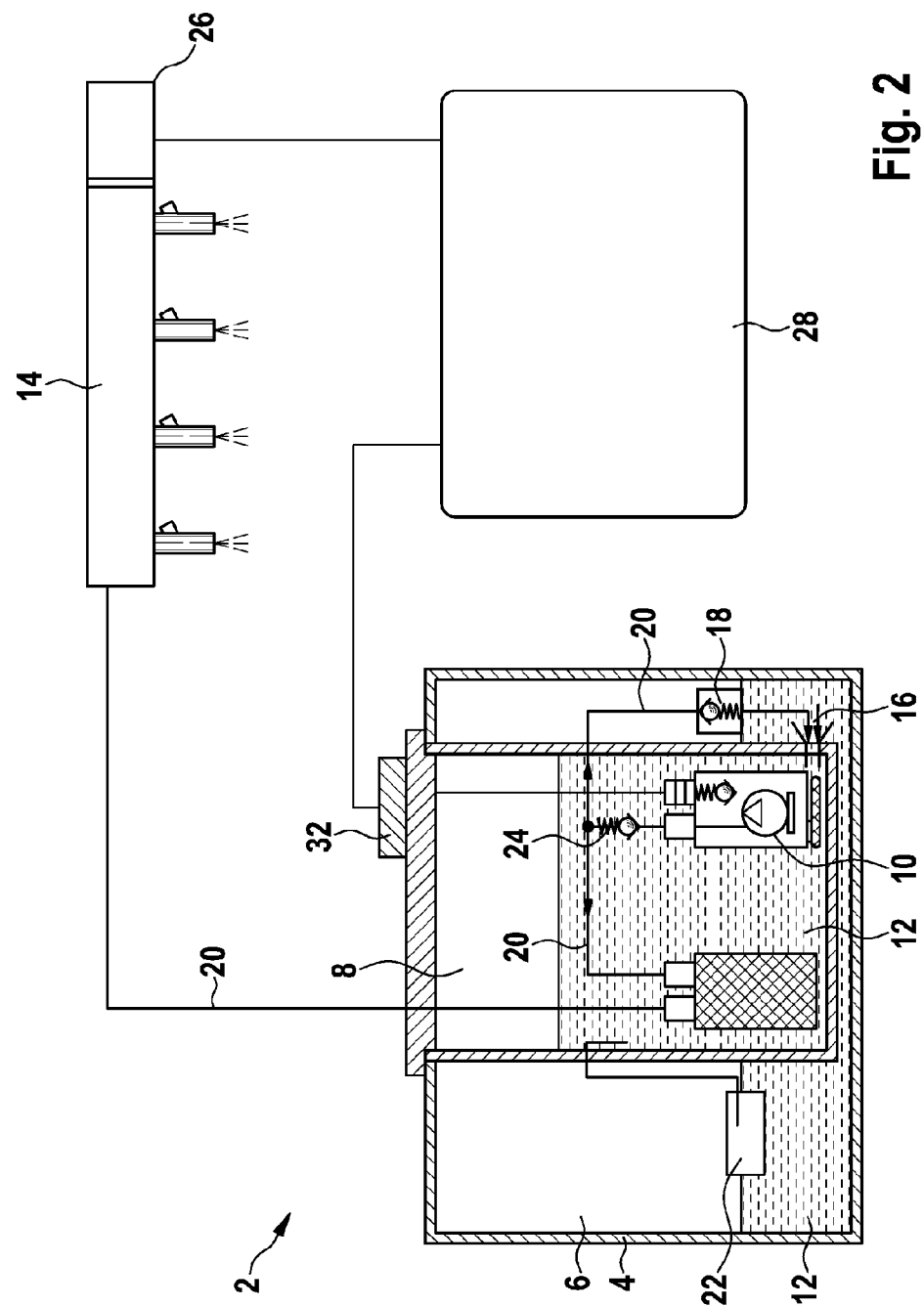
FIG. 2 shows a further exemplary embodiment of a tank arrangement according to the present invention.

Furthermore, making reference to FIG. 2 which shows a further exemplary embodiment of a tank arrangement according to the present invention.

FIG. 2 corresponds substantially to the construction according to FIG. 1, FIG. 2 not showing a saddle tank with fuel chambers 6*a, b*, however, but rather a fuel tank 4 with only one fuel chamber 6. The pressure regulating element 18 is therefore connected to the line system 20 in such a way that, if a limit pressure of the is exceeded, the pressure regulating element 18 opens and activates a pump unit 16, for example a suction jet pump, as a result of which fuel 12 may be delivered into the tank installation unit 8. The activation of the suction jet pump 16 and therefore opening and closing of the pressure regulating element 18 may be detected via the tank level sensor 22.

In the case where the tank installation unit 8 is filled substantially completely, a situation may be conceivable, in which the tank level sensor 22 is capable of detecting substantially no reduction in the fuel filling quantity even in the case of an activated pump unit 16, on account of fuel overflow of the tank installation unit 8 into the fuel chamber 6.

What is claimed is:

1. A tank arrangement, having
    a fuel tank having a plurality of fuel chambers and configured as a saddle tank;
    a tank installation unit arranged in the fuel tank;
    a fuel pump element located in a first chamber of the plurality of fuel chambers and set up to provide fuel from the tank arrangement to a fuel consumer;
    a first pump unit arranged in the first chamber and configured as a suction jet pump, the pump unit operatively connected to the fuel pump element and set up to deliver fuel from the first chamber into the tank installation unit;
    a second pump unit arranged in a second chamber of the plurality of fuel chambers;
    a tank level sensor located in the second chamber, the fuel pump element controllable as a function of a signal of the tank level sensor; and
    a pressure regulating element functionally arranged between the fuel pump element and the second pump unit, wherein the pressure regulating element is configured as a mechanical pressure regulator, and wherein the fuel pump element is actuatable in such a way that the system pressure is increased, starting from a system pressure, at which the pressure regulating element is closed, until the pressure regulating element is open such that fuel is delivered by the second pump unit, resulting in a drop in the tank level, which can be detected using the tank level sensor.

2. The tank arrangement as claimed in claim 1, the tank arrangement being connectable to the fuel consumer with the use of a line system, and the pressure regulating element being set up to maintain a required system pressure between the fuel pump element and the fuel consumer.

3. The tank arrangement as claimed in claim 1, the pressure regulating element being set up to reduce a system pressure which is increased above a required system pressure to the required system pressure.

4. The tank arrangement as claimed in claim 1, a pilot control characteristic diagram of the fuel pump element being adjustable to one or more system pressures as a function of a signal.

5. The tank arrangement as claimed in claim 1, the fuel pump element being actuatable using a pulse width modulation signal; and the pulse width modulation signal being modifiable as a function of a signal of the tank level sensor.

6. The tank arrangement as claimed in claim 1, having, furthermore, a pressure valve, arranged between the fuel pump element and the line system;

the pressure valve being set up so as to make a fuel flow possible from the fuel pump element into the line system; the pressure valve opening under the use of a pressure, which pressure is lower than the required system pressure.

7. A vehicle having a tank arrangement as claimed in claim 1.

8. The tank arrangement as claimed in claim 1, a pilot control characteristic diagram of the fuel pump element being adjustable to one or more system pressures as a function of a signal of the tank level sensor.

9. The tank arrangement as claimed in claim 1, the fuel pump element being actuatable in such a way that the system pressure is lowered, starting from a system pressure, at which the pressure regulating element is open, until a drop in the tank level can no longer be detected using the tank level sensor.

10. The tank arrangement as claimed in claim 1, the fuel tank having a plurality of fuel chambers; and each fuel chamber having a pump unit.

11. The tank arrangement as claimed in claim 1, the fuel pump element being actuatable in such a way that the system pressure is lowered, starting from a system pressure, at which the pressure regulating element is open, until a drop in the tank level can no longer be detected using the tank level sensor.

12. The tank arrangement as claimed in claim 1, the fuel tank having a plurality of fuel chambers; and each fuel chamber having a pump unit.

13. A tank arrangement, having
   a fuel tank having a plurality of fuel chambers and configured as a saddle tank, each fuel chamber having a pump unit;
   a tank installation unit arranged in the fuel tank;
   a fuel pump element located in a first chamber of the plurality of fuel chambers and set up to provide fuel from the tank arrangement to a fuel consumer;
   a pump unit arranged in a second chamber of the plurality of fuel chambers and configured as a suction jet pump, the pump unit operatively connected to the fuel pump element and set up to deliver fuel from the second fuel chamber into the tank installation unit;
   a tank level sensor located in the second chamber of the plurality of fuel chambers, the fuel pump element controllable as a function of a signal of the tank level sensor; and
   a pressure regulating element functionally arranged between the fuel pump element and the pump unit, wherein the pressure regulating element is configured as a mechanical pressure regulator, and wherein the fuel pump element is actuatable in such a way that the system pressure is increased, starting from a system pressure, at which the pressure regulating element is closed, until the pressure regulating element is open such that fuel is delivered by the pump unit, resulting in a drop in the tank level, which can be detected using the tank level sensor.

14. The tank arrangement as claimed in claim 13, the tank arrangement being connectable to the fuel consumer with the use of a line system, and the pressure regulating element being set up to maintain a required system pressure between the fuel pump element and the fuel consumer.

15. The tank arrangement as claimed in claim 13, the pressure regulating element being set up to reduce a system pressure which is increased above a required system pressure to the required system pressure.

16. The tank arrangement as claimed in claim 13, a pilot control characteristic diagram of the fuel pump element being adjustable to one or more system pressures as a function of a signal.

17. The tank arrangement as claimed in claim 13, the fuel pump element being actuatable using a pulse width modulation signal; and the pulse width modulation signal being modifiable as a function of a signal of the tank level sensor.

18. The tank arrangement as claimed in claim 13, having, furthermore, a pressure valve, arranged between the fuel pump element and the line system; the pressure valve being set up so as to make a fuel flow possible from the fuel pump element into the line system; the pressure valve opening under the use of a pressure, which pressure is lower than the required system pressure.

19. A vehicle having a tank arrangement as claimed in claim 13.

20. The tank arrangement as claimed in claim 13, a pilot control characteristic diagram of the fuel pump element being adjustable to one or more system pressures as a function of a signal of the tank level sensor.

* * * * *